United States Patent
Lee et al.

(10) Patent No.: US 12,385,875 B2
(45) Date of Patent: Aug. 12, 2025

(54) BIOSENSOR

(71) Applicant: Taiwan Semiconductor Manufacturing Company, Ltd., Hsinchu (TW)

(72) Inventors: Wei Lee, Hsinchu (TW); Katherine H Chiang, New Taipei (TW); Pei-Wen Liu, Hsinchu (TW); Ke-Wei Su, Hsinchu County (TW); Kuan-Lun Cheng, Hsin-Chu (TW)

(73) Assignee: Taiwan Semiconductor Manufacturing Company, Ltd., Hsinchu (TW)

( * ) Notice: Subject to any disclaimer, the term of this patent is extended or adjusted under 35 U.S.C. 154(b) by 744 days.

(21) Appl. No.: 17/744,749

(22) Filed: May 16, 2022

(65) Prior Publication Data

US 2023/0366851 A1  Nov. 16, 2023

(51) Int. Cl.
*G01N 27/414* (2006.01)
(52) U.S. Cl.
CPC ................................ *G01N 27/4145* (2013.01)
(58) Field of Classification Search
CPC combination set(s) only.
See application file for complete search history.

(56) References Cited

U.S. PATENT DOCUMENTS

| | | | |
|---|---|---|---|
| 2018/0164246 A1* | 6/2018 | Chen | H10D 86/201 |
| 2020/0103369 A1* | 4/2020 | Lin | B01L 3/502715 |
| 2020/0182826 A1* | 6/2020 | Liu | G01N 27/4145 |

* cited by examiner

*Primary Examiner* — Mark W Tornow
*Assistant Examiner* — Priya M Rampersaud
(74) *Attorney, Agent, or Firm* — JCIPRNET

(57) ABSTRACT

A biosensor including a first sensor, a second sensor, a patterned dielectric layer and a cover is provided. The first sensor includes a first voltage-reference device and a first bio-sensing device. The second sensor is disposed adjacent to the first sensor, the second sensor includes a second voltage-reference device and a second bio-sensing device, the first sensor is spaced apart from the second sensor by a lateral distance, and the lateral distance is greater than a half of an average lateral dimension of the first voltage-reference device and the second voltage-reference device. The patterned dielectric layer includes sensing wells located above the first voltage-reference device, the first bio-sensing device, the second voltage-reference device and the second bio-sensing device. The cover includes fluid channels communicating with the sensing wells.

20 Claims, 14 Drawing Sheets

BIOSENSOR

BACKGROUND

Biosensors are devices for sensing and detecting biomolecules and operate on the basis of electronic, electrochemical, optical, and mechanical detection principles. Biosensors that include transistors are sensors that electrically sense charges, photons, and mechanical properties of bio-entities or biomolecules. The detection can be performed by detecting the bio-entities or biomolecules themselves, or through interaction and reaction between specified reactants and bio-entities/biomolecules. Such biosensors can be manufactured using semiconductor processes, can quickly convert electric signals, and can be easily applied to integrated circuits (ICs) and Micro-Electro-Mechanical Systems (MEMS). Currently, reliability of the bio-MEMS devices can be a challenge because of poor electrical isolation between adjacent sensing units of the bio-MEMS devices.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

DETAILED DESCRIPTION

Figure 1:
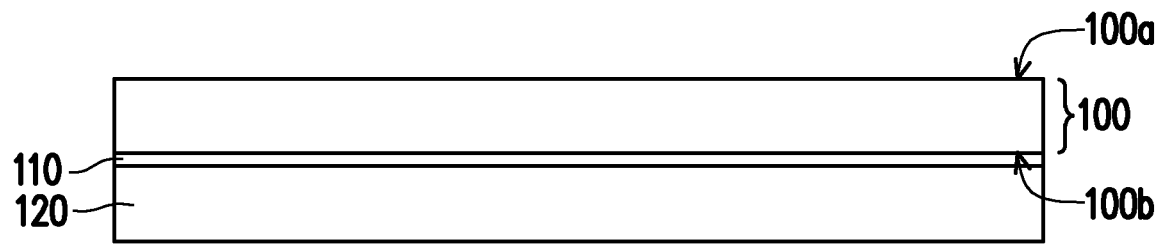
FIGS. 1 through 11 are cross-sectional views schematically illustrating a process flow for fabricating biosensors in accordance with some embodiments of the present disclosure.

The following disclosure provides many different embodiments, or examples, for implementing different features of the provided subject matter. Specific examples of components and arrangements are described below to simplify the present disclosure. These are, of course, merely examples and are not intended to be limiting. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

Further, spatially relative terms, such as "beneath", "below", "lower", "above", "upper" and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly.

Unless defined otherwise, all technical and scientific terms used herein have the same meanings as commonly understood by one of ordinary skill in the art to which this disclosure belongs. Although any methods and materials similar or equivalent to those described herein can be used in the practice or testing of embodiments in accordance with the disclosure; the methods, devices, and materials are now described.

FIGS. 1 through 11 are cross-sectional views schematically illustrating a process flow for fabricating biosensors in accordance with some embodiments of the present disclosure.

Referring to FIG. 1, a semiconductor substrate 100 is provided. The semiconductor substrate 100 may include a first surface 100a (e.g., a front-side surface) and a second surface 100b (e.g., a back-side surface), and the second surface 100b is opposite to the first surface 100a. In some embodiments, the first surface 100a is a front-side surface, and the second surface 100b is a back-side surface which is opposite to the front-side surface. The semiconductor substrate 100 may include a crystalline silicon wafer. In some alternative embodiments, the semiconductor substrate 100 may be made of some other suitable elemental semiconductor, such as diamond or germanium; a suitable compound semiconductor, such as gallium arsenide, silicon carbide, indium arsenide, or indium phosphide; or a suitable alloy semiconductor, such as silicon germanium carbide, gallium arsenic phosphide, or gallium indium phosphide. A sensing film 110 and a dielectric layer 120 are subsequently formed on the second surface 100b of the semiconductor substrate 100 such that the sensing film 110 is between the semiconductor substrate 100 and the dielectric layer 120. The sensing film 110 is a layer of immobilized capture reagents that act as surface receptors to detect the presence of a target analyte of biological origin. For example, the material of the sensing film 110 includes $HfO_2$, $SiO_2$, SiON, SiN or other suitable sensing materials. In some embodiments, the sensing film 110 is formed by a material layer; in other words, regions of the sensing film 110 are formed by the same sensing material. In some alternative embodiments, the sensing film 110 includes regions formed by different materials; in other words, the sensing film may include regions formed by different sensing material.

Furthermore, in some embodiments, the dielectric layer 120 includes a silicon dioxide ($SiO_2$) layer, a silicon nitride layer ($SiN_x$) or other suitable dielectric layer. In some alternative embodiments, the dielectric layer 120 includes a high-k dielectric layer or a low-k dielectric layer. The expression "high-k" refers to a high dielectric constant. As used herein, high-k refers to a dielectric constant that is greater than the dielectric constant of $SiO_2$ (i.e., greater than 3.9). Similarly, the expression "low-k" refers to a low dielectric constant. As used herein, low-k refers to a dielectric constant that is less than the dielectric constant of $SiO_2$ (i.e., less than 3.9).

The sensing film 110 and the dielectric layer may be formed on the second surface 100b of the semiconductor substrate 100 through a chemical vapor deposition (CVD) process, a physical vapor deposition (PVD) process or other suitable deposition process.

As used herein, the term "immobilized" when used with respect to, e.g., a capture reagent, includes substantially attaching the capture reagent at a molecular level to a surface. For example, a capture reagent may be immobilized to a surface of the sensing layer using adsorption techniques including non-covalent interactions (e.g., electrostatic forces, van der Waals, and dehydration of hydrophobic interfaces) and covalent binding techniques where functional groups or linkers facilitate attaching the capture reagent to the surface of the sensing layer. Immobilizing a capture reagent to a surface of a sensing layer may be based upon the properties of the surface, the medium carrying the capture reagent, and the properties of the capture reagent. In some cases, a surface of the sensing layer may be first modified to have functional groups bound thereto. The functional groups may then bind to biomolecules or biological or chemical substances to immobilize them thereon.

"Capture reagent" as used herein, is a molecule or compound capable of binding the target analyte or target reagent, which can be directly or indirectly attached to a substantially solid material. The capture reagent can be a chemical, and specifically any substance for which there exists a naturally occurring target analyte (e.g., an antibody, polypeptide, DNA, RNA, cell, virus, etc.) or for which a target analyte can be prepared, and the capture reagent can bind to one or more target analytes in an assay.

The term "chemical" refers to a substance, compound, mixture, solution, emulsion, dispersion, molecule, ion, dimer, macromolecule such as a polymer or protein, biomolecule, precipitate, crystal, chemical moiety or group, particle, nanoparticle, reagent, reaction product, solvent, or fluid any one of which may exist in the solid, liquid, or gaseous state, and which is typically the subject of an analysis.

The term "reaction" refers to a physical, chemical, biochemical, or biological transformation that involves at least one chemical and that generally involves (in the case of chemical, biochemical, and biological transformations) the breaking or formation of one or more bonds such as covalent, noncovalent, van der Waals, hydrogen, or ionic bonds. The term includes typical chemical reactions such as synthesis reactions, neutralization reactions, decomposition reactions, displacement reactions, reduction-oxidation reactions, precipitation, crystallization, combustion reactions, and polymerization reactions, as well as covalent and non-covalent binding, phase change, color change, phase formation, crystallization, dissolution, light emission, changes of light absorption or emissive properties, temperature change or heat absorption or emission, conformational change, and folding or unfolding of a macromolecule such as a protein.

The term "antibody" as used herein refers to a polypeptide of the immunoglobulin family that is capable of binding a corresponding antigen non-covalently, reversibly, and in a specific manner. For example, a naturally occurring IgG antibody is a tetramer comprising at least two heavy (H) chains and two light (L) chains inter-connected by disulfide bonds. Each heavy chain is comprised of a heavy chain variable region (abbreviated herein as VH) and a heavy chain constant region. The heavy chain constant region is comprised of three domains, CH1, CH2 and CH3. Each light chain is comprised of a light chain variable region (abbreviated herein as VL) and a light chain constant region. The light chain constant region is comprised of one domain, CL. The VH and VL regions can be further subdivided into regions of hypervariability, termed complementarity determining regions (CDR), interspersed with regions that are more conserved, termed framework regions (FR). Each VH and VL is composed of three CDRs and four FRs arranged from amino-terminus to carboxy-terminus in the following order: FR1, CDR1, FR2, CDR2, FR3, CDR3, and FR4. The three CDRs constitute about 15-20% of the variable domains. The variable regions of the heavy and light chains contain a binding domain that interacts with an antigen. The constant regions of the antibodies may mediate the binding of the immunoglobulin to host tissues or factors, including various cells of the immune system (e.g., effector cells) and the first component (C1q) of the classical complement system. (Kuby, Immunology, 4th ed., Chapter 4. W.H. Freeman & Co., New York, 2000).

The term "antibody" includes, but is not limited to, monoclonal antibodies, human antibodies, humanized antibodies, chimeric antibodies, and anti-idiotypic (anti-Id) antibodies (including, e.g., anti-Id antibodies to antibodies of the invention). The antibodies can be of any isotype/class (e.g., IgG, IgE, IgM, IgD, IgA and IgY), or subclass (e.g., IgGi, IgG2, IgG3, IgG4, IgA1 and IgA2).

The term "assay" generally refers to a process or step involving the analysis of a chemical or a target analyte and includes, but is not limited to, cell-based assays, biochemical assays, high-throughput assays and screening, diagnostic assays, pH determination, nucleic acid hybridization assays, polymerase activity assays, nucleic acid and protein sequencing, immunoassays (e.g., antibody-antigen binding assays, ELISAs, and iqPCR), bisulfite methylation assays for detecting methylation pattern of genes, protein assays, protein binding assays (e.g., protein-protein, protein nucleic acid, and protein-ligand binding assays), enzymatic assays, coupled enzymatic assays, kinetic measurements (e.g., kinetics of protein folding and enzymatic reaction kinetics), enzyme inhibitor and activator screening, chemiluminescence and electrochemiluminescence assays, fluorescent assays, fluorescence polarization and anisotropy assays, absorbance and colorimetric assays (e.g., Bradford assay, Lowry assay, Hartree-Lowry assay, Biuret assay, and BCA assay), chemical assays (e.g., for the detection of environmental pollutants and contaminants, nanoparticles, or polymers), and drug discovery assays.

"Target analyte" as used herein, is the substance to be detected in the test sample using embodiments in accordance with this disclosure. The target analyte can be a chemical, and specifically any substance for which there exists a naturally occurring capture reagent (e.g., an antibody, polypeptide, DNA, RNA, cell, virus, etc.) or for which a capture reagent can be prepared, and the target analyte can bind to one or more capture reagents in an assay. "Target analyte" also includes any antigenic substances, antibodies, and combinations thereof. The target analyte can include a protein, a peptide, an amino acid, a carbohydrate, a hormone, a steroid, a vitamin, a drug including those administered for therapeutic purposes as well as those administered for illicit purposes, a bacterium, a virus, and metabolites of or antibodies to any of the above substances.

"Test sample" as used herein, means the composition, solution, substance, gas, or liquid containing the target analyte to be detected and assayed. The test sample can contain other components besides the target analyte, can have the physical attributes of a liquid, or a gas, and can be of any size or volume, including for example, a moving stream of liquid or gas. The test sample can contain any substances other than the target analyte as long as the other substances do not interfere with the binding of the target analyte with the capture reagent or the specific binding of the first binding member to the second binding member. Examples of test samples include, but are not limited to, naturally-occurring and non-naturally occurring samples or combinations thereof. Naturally-occurring test samples can be synthetic or synthesized. Naturally occurring test samples include body or bodily fluids isolated from anywhere in or on the body of a subject, including but not limited to, blood, plasma, serum, urine, saliva or sputum, spinal fluid, cerebrospinal fluid, pleural fluid, nipple aspirates, lymph fluid, fluid of the respiratory, intestinal, and genitourinary tracts, tear fluid, saliva, breast milk, fluid from the lymphatic system, semen, intra-organ system fluid, ascitic fluid, tumor cyst fluid, amniotic fluid and combinations thereof, and environmental samples such as ground water or waste water, soil extracts, air, and pesticide residues or food-related samples.

The term "analysis" generally refers to a process or step involving physical, chemical, biochemical, or biological analysis that includes, but is not limited to, characterization, testing, measurement, optimization, separation, synthesis, addition, filtration, dissolution, or mixing.

The term "measurement" generally refers to the process of determining the amount, quantity, quality, or property of a target analyte based on its binding to a capture reagent.

The term "detection" generally refers to the process of determining the presence or absence of a target analyte based on its binding to a capture reagent. Detection includes but is not limited to identification, measurement, and quantitation. Detected substances can include, e.g., nucleic acids (including DNA and RNA), hormones, different pathogens (including a biological agent that causes disease or illness to its host, such as a virus (e.g., H7N9 or HIV), a protozoan (e.g., *Plasmodium*-causing malaria), or a bacteria (e.g., *E. coli* or *Mycobacterium tuberculosis*)), proteins, antibodies, various drugs or therapeutics or other chemical or biological substances, including hydrogen or other ions, non-ionic molecules or compounds, polysaccharides, small chemical compounds such as chemical combinatorial library members, and the like. Detected or determined parameters may include but are not limited to, e.g., pH changes, lactose changes, changing concentration, particles per unit time where a fluid flows over the device for a period of time to detect particles, e.g., particles that are sparse, and other parameters.

Figure 2:
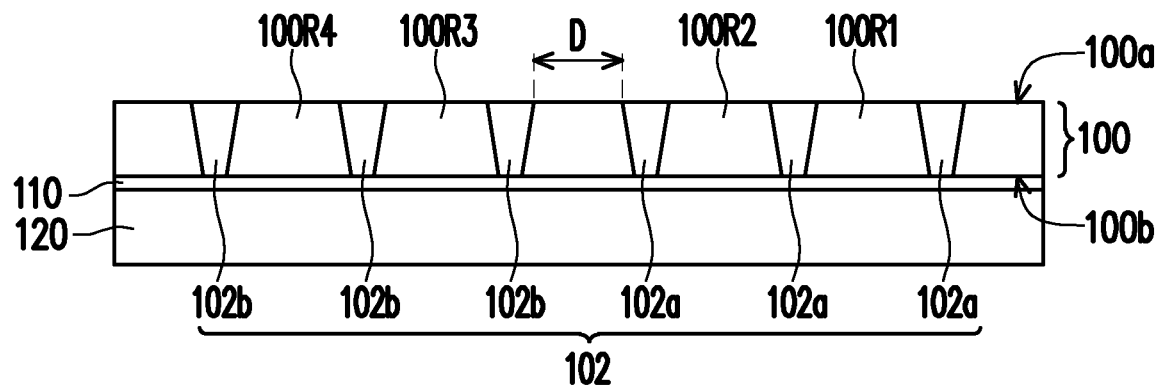

Referring to FIG. 2, isolation structures 102 are formed in the semiconductor substrate 100. The isolation structures 102 extend from the first surface 100a of the semiconductor substrate 100 to the second surface of the semiconductor substrata 100. The isolation structures 102 penetrate through the semiconductor substrate 100. As illustrated in FIG. 2, the top ends of the isolation structures 102 substantially level with the first surface 100a of the semiconductor substrate 100, and the bottom ends of the isolation structures 102 substantially level with the sensing film 110. The lateral dimension (e.g., width) of top ends of the isolation structures 102 may be greater than the lateral dimension (e.g., width) of the bottom ends of the isolation structures 102. The top ends of the isolation structures 102 are revealed from the first surface 100a of the semiconductor substrate 100, and the bottom ends of the isolation structures 102 are in contact with the sensing film 110. In some embodiments, the isolation structures 102 include shallow trench isolation (STI) structures. In an embodiment where the isolation structures 102 include shallow trench isolation (STI) structures, trenches are formed in the semiconductor substrate 100, and a dielectric material are deposited over the semiconductor substrate 100, and a planarization process is then performed to remove the excess dielectric material (e.g., the dielectric material located outside the trenches). The planarization process may be or include a chemical mechanical polishing (CMP) process, a mechanical grinding process, an etch process or combinations thereof. In some other embodiments, not shown in figures, the isolation structures 102 include local oxidation of silicon (LOCOS) structures. In an embodiment wherein the isolation structures 102 include local oxidation of silicon (LOCOS) structures, a patterned mask layer is formed over the first surface 100a of the semiconductor substrate 100, and a thermal process is performed to oxidize the portions of the semiconductor substrate 100 which are revealed by the patterned mask layer. The patterned mask layer may include a pad layer (e.g., a pad oxide layer) and a hard mask layer (e.g., a silicon nitride layer) stacked over the pad layer, and the thermal process may include a thermal oxidation process (e.g., a rapid thermal annealing process).

The isolation structures 102 may include a first isolation structure 102a and a second isolation structure 102b that is spaced apart from the first isolation structure 120a. A first region 100R1 and a second region 100R2 of the semiconductor substrate 100 are defined and surrounded by the first isolation structure 102a, and the first region 100R1 is insulated from the second region 100R2. A third region 100R3 and a fourth region 100R4 of the semiconductor substrate 100 are defined and surrounded by the second isolation structure 100b, and the third region 100R3 is insulated from the fourth region 100R4. As shown in FIG. 2, the lateral dimension of the first region 100R1, the second region 100R2, the third region 100R3 and the fourth region 100R4 may be substantially identical to each other, the first isolation structure 102a is spaced apart from the second isolation structure 102b by a lateral distance D, and the lateral distance D is greater than a half of the average lateral dimension of any two regions among the first region 100R1, the second region 100R2, the third region 100R3 and the fourth region 100R4. For example, the lateral distance D is greater than a half of the average lateral dimension of the first region 100R1 and the third region 100R3. The first region 100R1 and the second region 100R2 of the semiconductor substrate 100 are oxide defined (OD) regions for formation of a first sensor, while the third region 100R3 and the fourth region 100R4 of the semiconductor substrate 100 are oxide defined (OD) regions for formation of a second sensor. The details of the formation of the first and second sensors are described in accompany with FIG. 3 through FIG. 7.

Figure 3:
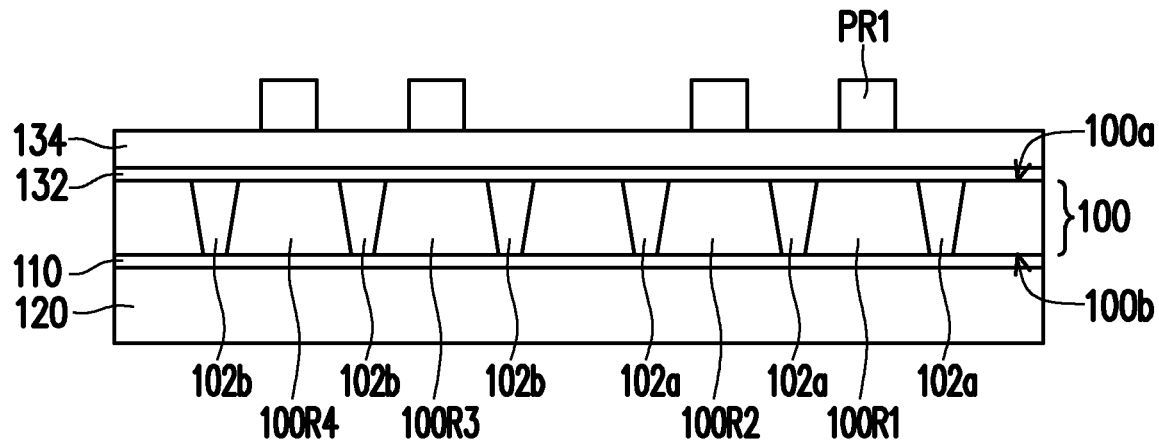

Referring to FIG. 3, a gate dielectric material layer 132, a conductive material layer 134, and a patterned photoresist layer PR1 are sequentially formed over the first surface 100a of the semiconductor substrate 100. The patterned photoresist layer PR1 covers portions of the conductive material layer 134 which are located above the first region 100R1, the second region 100R2, the third region 100R3 and the fourth region 100R4. The gate dielectric material layer 132 and the conductive material layer 134 may be formed by deposition processes, such as CVD processes, PVD processes or other suitable deposition processes. The material of the gate dielectric material layer 132 may be or include silicon oxide ($SiO_x$, where x>0), silicon nitride ($SiN_x$, where x>0), silicon oxynitride ($SiO_xN_y$, where x>0 and y>0) or other suitable dielectric materials, and the material of the conductive material layer 134 may be or include Hf, Al, Ta, Ti, O, N, C, La, Au, Ag, Pt, Co, Ni, Sn, Sb, Ga, In, Ge, Bi or other suitable conductive materials. The gate dielectric material layer 132 and the conductive material layer 134 are deposited to entirely cover the first surface 100a of the semiconductor substrate 100. The patterned photoresist layer PR1 may be formed over the conductive material layer 134 by spin-coating, soft baking, exposure, development, hard baking and cleaning processes.

Figure 4:
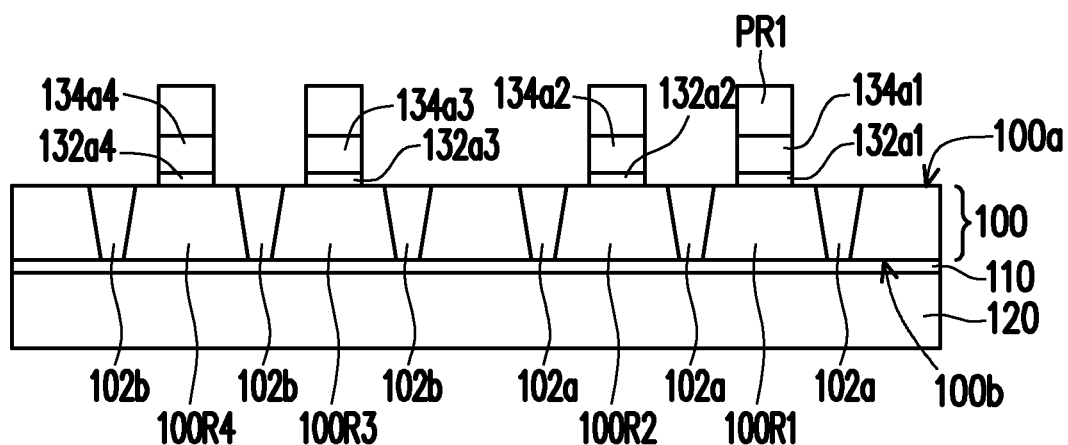

Referring to FIG. 3 and FIG. 4, a patterned process is performed to remove portions of the conductive material layer 134 and the gate dielectric material layer 132 which are not covered by the patterned photoresist layer PR1 until the first surface 100a of the semiconductor substrate 100, the top end of the first isolation structure 102a and the top end of the second isolation structure 102b are revealed. In some embodiments, an etch process including a single etching step or multiple etching steps is performed to remove the portions of the conductive material layer 134 and the gate dielectric material layer 132 which are not covered by the patterned photoresist layer PR1. After the patterned process of the conductive material layer 134 and the gate dielectric material layer 132 is performed, gate dielectric layers 132a1, 132a2, 132a3 and 132a4 as well as gate electrodes 134a1, 134a2, 134a3 and 134a4 are formed, wherein the gate dielectric layer 132a1 and the gate electrode 134a1 are stacked over the first region 100R1 of the semiconductor substrate 100, the gate dielectric layer 132a2 and the gate electrode 134a2 are stacked over the second region 100R2 of the semiconductor substrate 100, the gate dielectric layer 132a3 and the gate electrode 134a3 are stacked over the third region 100R3 of the semiconductor substrate 100, and the gate dielectric layer 132a4 and the gate electrode 134a4 are stacked over the fourth region 100R4 of the semiconductor substrate 100.

Figure 5:
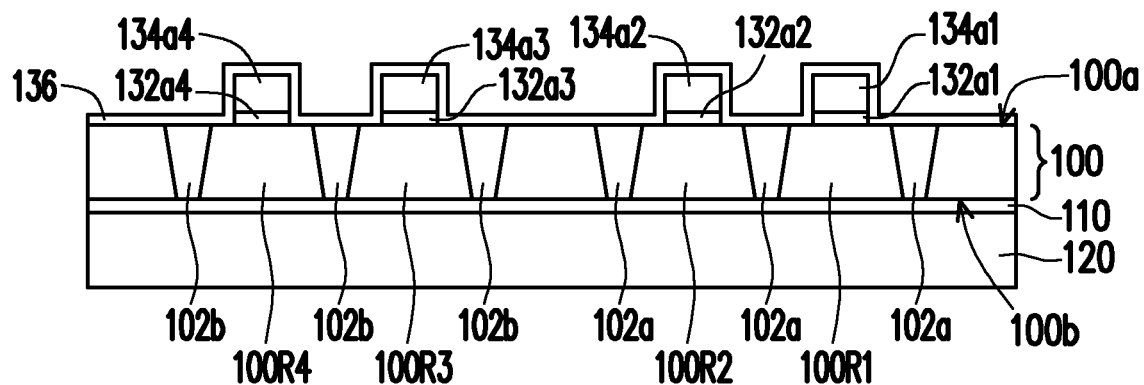

Referring to FIG. 4 and FIG. 5, the patterned photoresist layer PR1 is removed from the gate electrodes 134a1, 134a2, 134a3 and 134a4 through a stripping process, for example. After performing the removal process of the gate electrodes 134a1, 134a2, 134a3 and 134a4, a dielectric material layer 136 is formed over the first surface 100a of the semiconductor substrate 100 to conformally cover the gate dielectric layers 132a1, 132a2, 132a3 and 132a4 as well as the gate electrodes 134a1, 134a2, 134a3 and 134a4. The material of the gate dielectric material layer 136 may be or include silicon oxide ($SiO_x$, where x>0), silicon nitride ($SiN_x$, where x>0), silicon oxynitride ($SiO_xN_y$, where x>0 and y>0) or other suitable dielectric materials.

Figure 6:
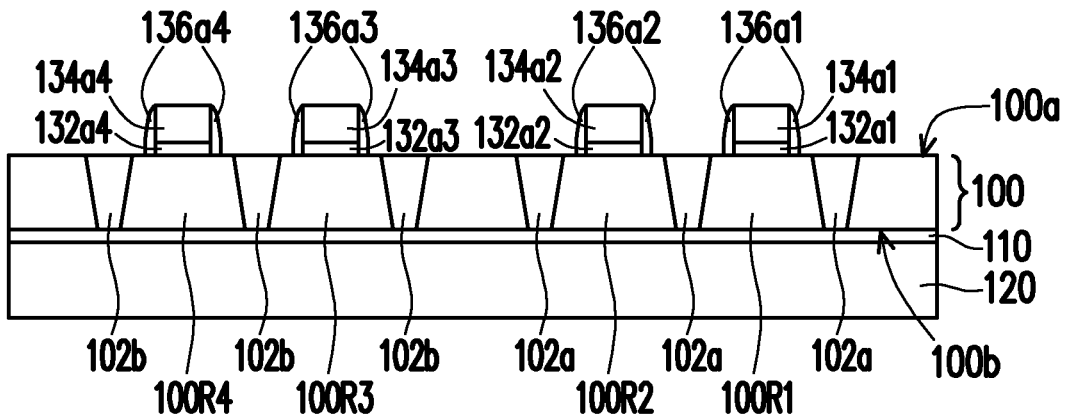

Referring to FIG. 5 and FIG. 6, a removal process is performed to partially remove the dielectric material layer 136 until the first surface 100a of the semiconductor substrate 100 and the top surfaces of the gate electrodes 134a1, 134a2, 134a3 and 134a4 are revealed. After performing the removal process of the dielectric material layer 136, pairs of gate spacers 136a1, 136a2, 136a3 and 136a4 are formed over the first region 100R1, the second region 100R2, the third region 100R3 and the fourth region 100R4, respectively. The pairs of gate spacers 136a1 covers sidewalls of the gate dielectric layer 132a1 and the gate electrode 134a1, the pairs of gate spacers 136a2 covers sidewalls of the gate dielectric layer 132a2 and the gate electrode 134a2, the pairs of gate spacers 136a3 covers sidewalls of the gate dielectric layer 132a3 and the gate electrode 134a3, and the pairs of gate spacers 136a4 covers sidewalls of the gate dielectric layer 132a4 and the gate electrode 134a4.

Figure 7:
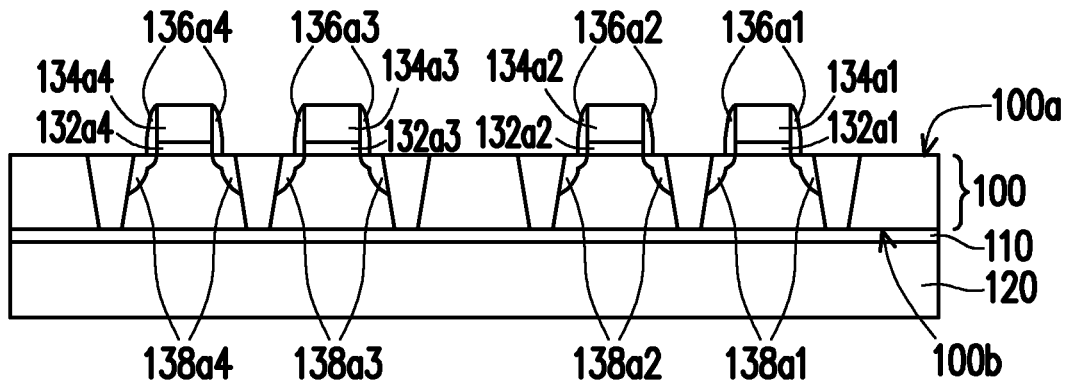

Referring to FIG. 7, source/drain regions 138a1, 138a2, 138a3 and 138a4 are respectively formed in the first region 100R1, the second region 100R2, the third region 100R3 and the fourth region 100R4 of the semiconductor substrate 100 depending on design requirements. The source/drain regions 138a1, 138a2, 138a3 and 138a4 may be doped with p-type dopants, such as boron or $BF_2$; n-type dopants, such as phosphorus or arsenic; and/or combinations thereof. In some embodiments, the source/drain regions 138a1, 138a2, 138a3 and 138a4 may be doped with p-type or n-type dopants. The gate electrode 134a1 and the source/drain regions 138a1 collectively configure as a first Field Effect Transistors (FET) 140a, the gate electrode 134a2 and the source/drain regions 138a2 collectively configure as a second FET 140b, the gate electrode 134a3 and the source/drain regions 138a3 collectively configure as a third FET 140c, and the gate electrode 134a4 and the source/drain regions 138a4 collectively configure as a fourth FET 140d.

The source/drain regions 138a1, 138a2, 138a3 and 138a4 may be configured for n-type Field Effect Transistors (FETs) and/or p-type FETs. A common type of FET is referred to as a metal oxide semiconductor field effect transistor (MOSFET). MOSFETs have been planar structures built in and on the planar surface of a substrate such as a semiconductor wafer. But recent advances in semiconductor manufacturing have resulted in three-dimensional, of fin-based, MOSFET structures.

Figure 8:
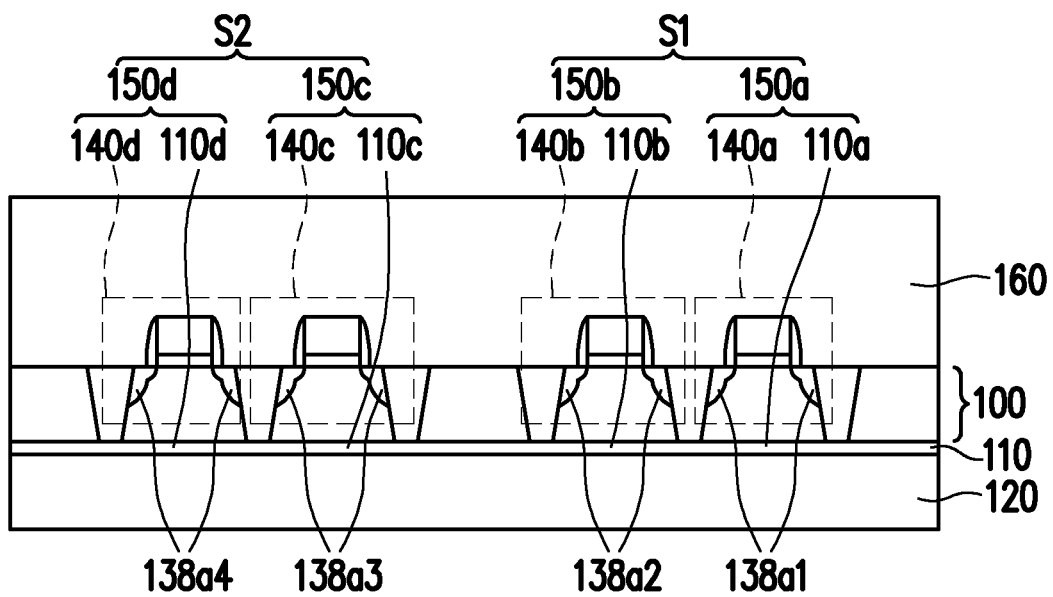

Referring to FIG. 8, after forming the first FET 140a, the second FET 140b, the third FET 140c and the fourth FET 140d, an interconnect structure 160 is formed over the semiconductor substrate 100. The interconnect structure 160 may be formed through Back-End of Line (BEOL) processes. The interconnect structure 160 may include one or more dielectric layers (for example, one or more interlayer dielectric (ILD) layers, intermetal dielectric (IMD) layers, or the like) and interconnect conductors embedded in the one or more dielectric layers, and the interconnect conductors are electrically connected to the semiconductor devices (e.g., the first FET 140a, the second FET 140b, the third FET 140c and the fourth FET 140d) formed in the semiconductor substrate 100. The material of the one or more dielectric layers may include silicon oxide ($SiO_x$, where x>0), silicon nitride ($SiN_x$, where x>0), silicon oxynitride ($SiO_xN_y$, where x>0 and y>0) or other suitable dielectric material. The interconnect conductors may include metallic conductors. For example, the interconnect conductors include copper conductors, copper pads, aluminum pads or combinations thereof.

As illustrated in FIG. 8, a first sensing portion 110a of the sensing film 110 and the first FET 140a including gate electrode 134a1 and the source/drain regions 138a1 collectively configure as a first voltage-reference device 150a, wherein the first sensing portion 110a is capacitively coupled to the first FET 140a.

A second sensing portion 110b of the sensing film 110 and the second FET 140b including gate electrode 134a2 and the source/drain regions 138a2 collectively configure as a first bio-sensing device 150b, wherein the second sensing portion 110b is capacitively coupled to the second FET 140b. The first voltage-reference device 150a and the first bio-sensing device 150b are collectively configure as a first sensor S1.

A third sensing portion 110a of the sensing film 110 and the third FET 140a including gate electrode 134a3 and the source/drain regions 138a3 collectively configure as a second voltage-reference device 150c, wherein the third sensing portion 110c is capacitively coupled to the third FET 140c.

A fourth sensing portion 110d of the sensing film 110 and the fourth FET 140d including gate electrode 134a4 and the source/drain regions 138a4 collectively configure as a second bio-sensing device 150d, wherein the fourth sensing portion 110d is capacitively coupled to the fourth FET 140d. The second voltage-reference device 150c and the second bio-sensing device 150d are collectively configure as a second sensor S2. Furthermore, the first sensor S1 and the second sensor S2 are collectively configure as a biosensor. In some other embodiments, the biosensor may include more than two sensors arranged in array, and each sensor may include a bio-sensing device and a voltage-reference device disposed adjacent to the bio-sensing device.

Figure 9:
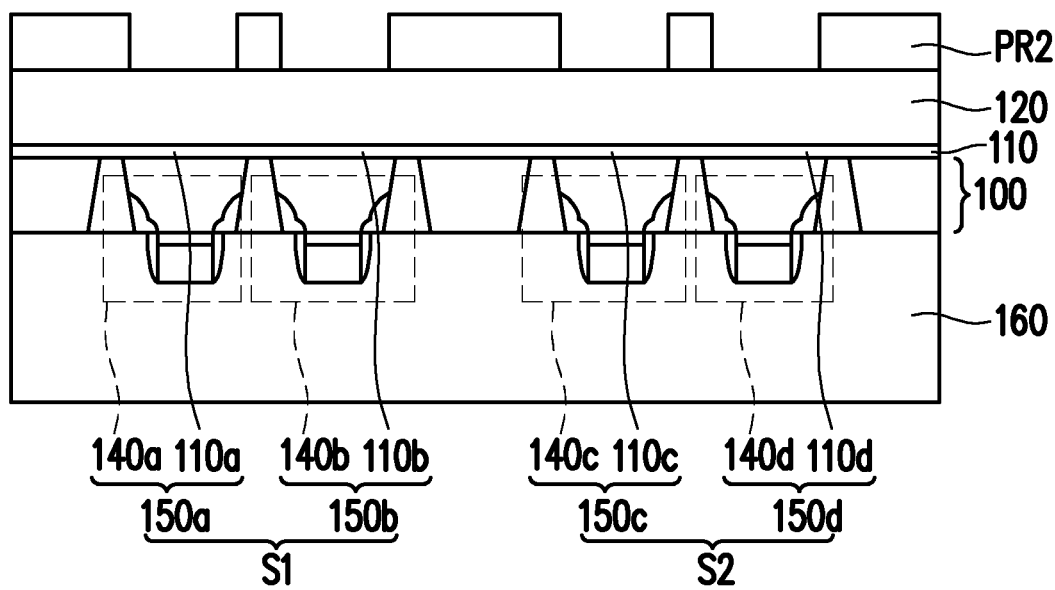

Referring to FIG. 8 and FIG. 9, the resulted structure illustrated in FIG. 8 are flipped upside down such that a patterned photoresist layer PR2 may be formed over the dielectric layer 120. Regions of the dielectric layer 120 may be revealed by the openings defined in the patterned photoresist layer PR2. The patterned photoresist layer PR2 may be formed over the dielectric layer 120 by spin-coating, soft baking, exposure, development, hard baking and cleaning processes.

Figure 10:
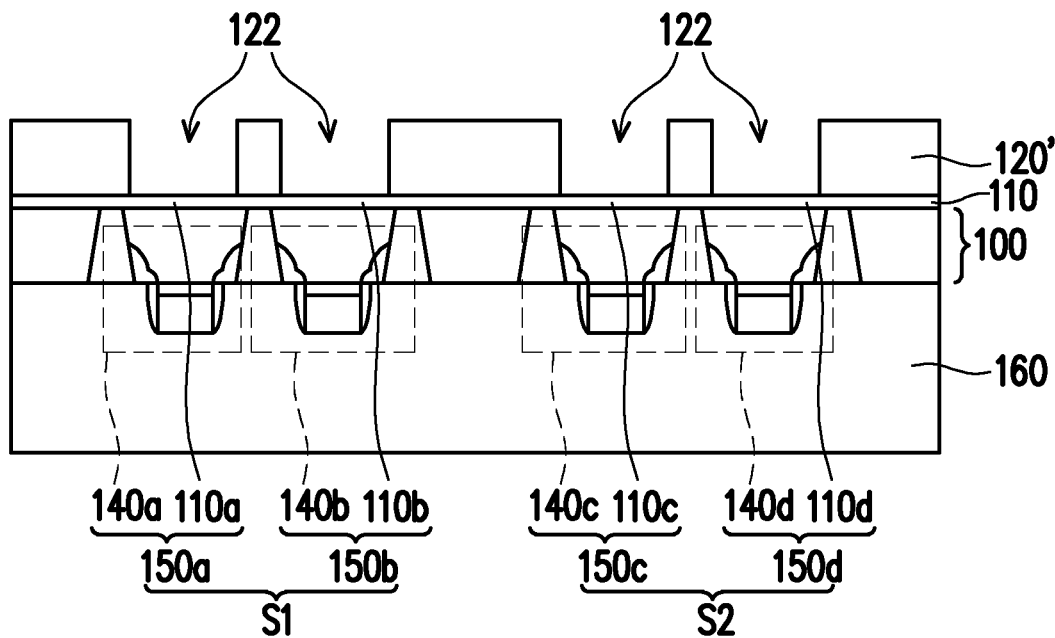

Referring to FIG. 9 and FIG. 10, a patterned process is performed to remove portions of the dielectric layer 120 which are not covered by the patterned photoresist layer PR2 until the first sensing portion 110a, the second sensing portion 110b, the third sensing portion 110c and the fourth sensing portion 110d of the sensing film 110 are are revealed. In some embodiments, an etch process is performed to remove the portions of the dielectric layer 120 which are not covered by the patterned photoresist layer PR2. After the patterned process of the dielectric layer 1202 is performed, a patterned dielectric layer 120' including sensing wells 122 defined therein is formed over the sensing film 110. The first sensing portion 110a, the second sensing portion 110b, the third sensing portion 110c and the fourth sensing portion 110d are revealed by the sensing wells 122 defined in the patterned dielectric layer 120'.

Figure 11:
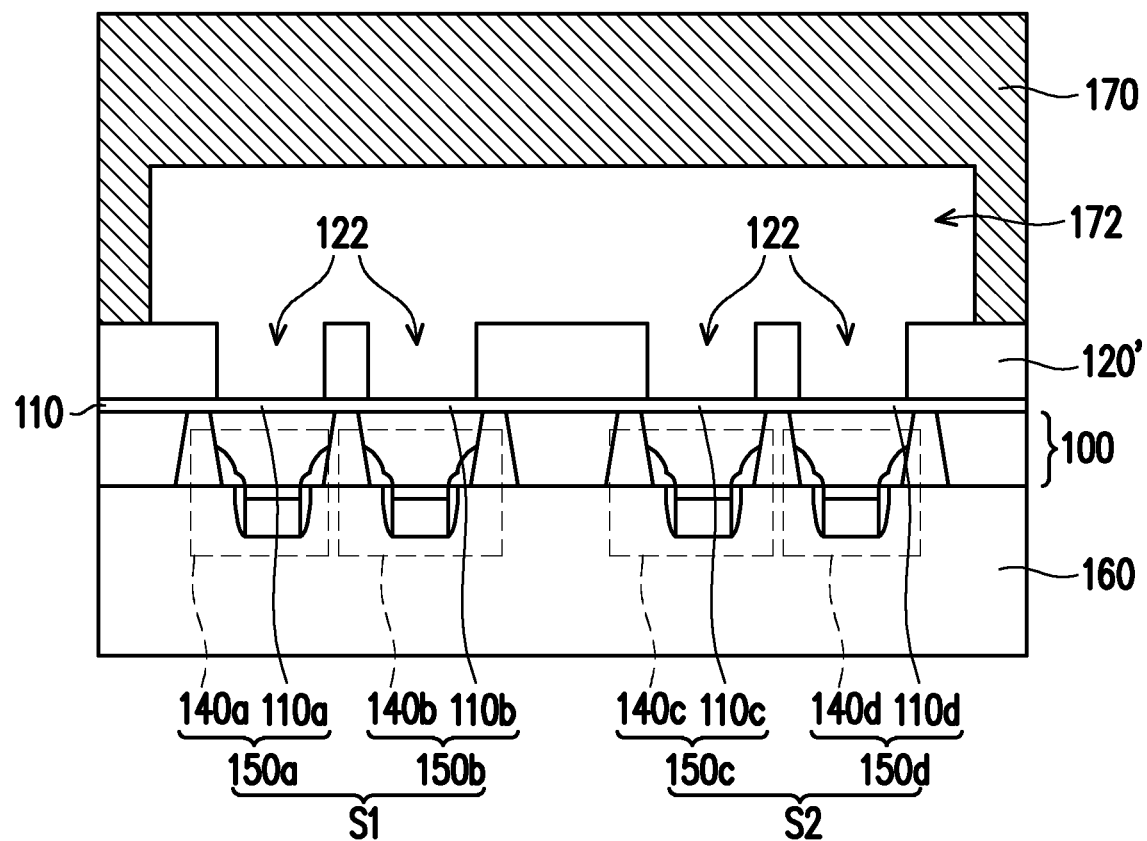

Referring to FIG. 11, a cover 170 including fluid channels 172 is provided and disposed over the patterned dielectric layer 120'. The fluid channels 172 of the cover 170 are distributed at the inner surface of the cover 170, and the fluid channels 172 of the cover 170 communicate with the sensing wells 122 formed in the patterned dielectric layer 120'. The fluid channels 172 of the cover 170 may guide and filtrate the capture reagent applied to the biosensor.

FIGS. 12 through 19 schematically illustrate cross-sectional views of various biosensors in accordance with some embodiments of the present disclosure.

Figure 12:
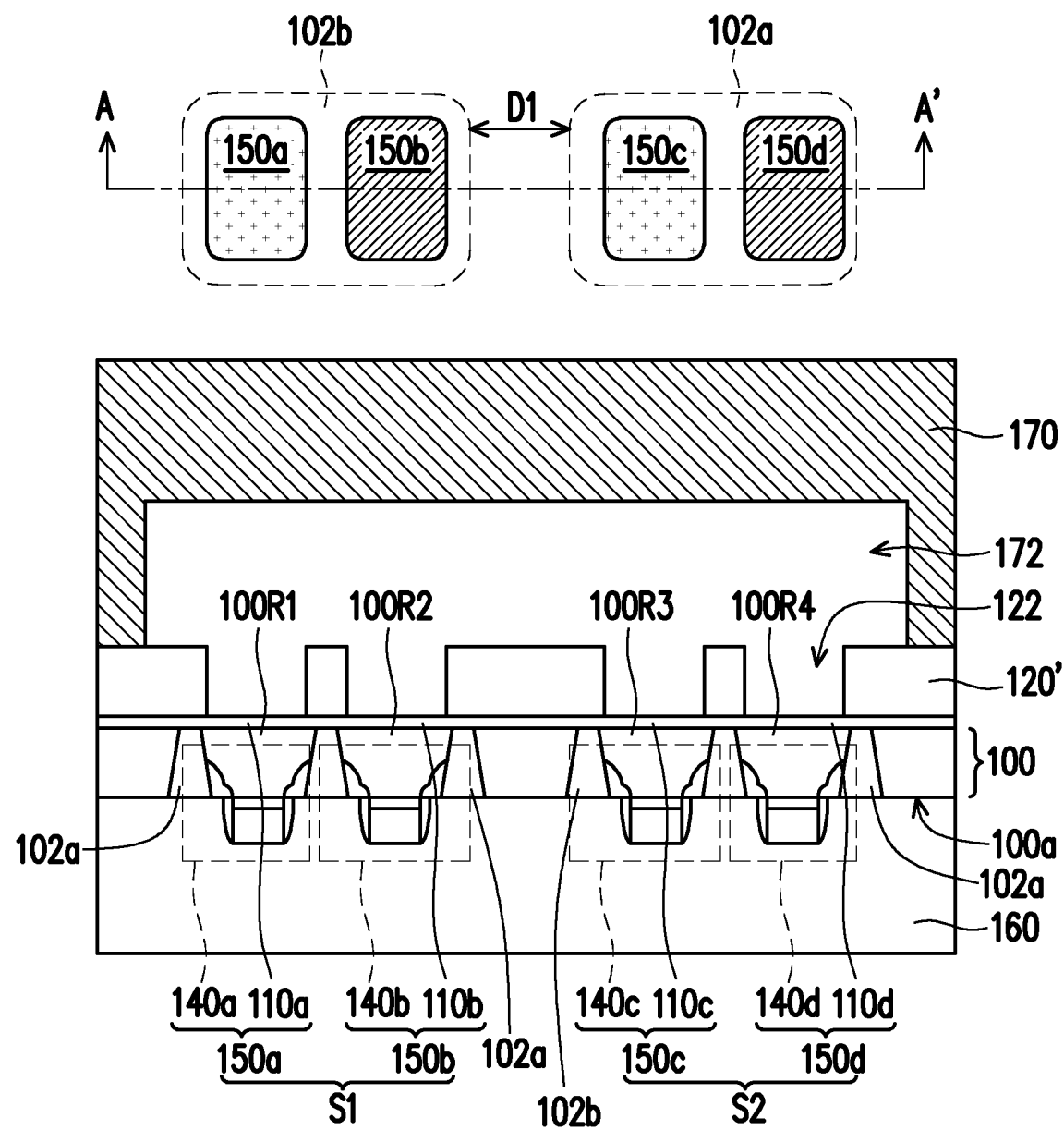
FIGS. 12 through 19 schematically illustrate cross-sectional views of various biosensors in accordance with some embodiments of the present disclosure.

Referring to FIG. 12, a biosensor including a first sensor S1, a second sensor S2, a patterned dielectric layer 120' and a cover 170 is provided. The first sensor S1 includes a first voltage-reference device 150a and a first bio-sensing device 150b. The second sensor S2 is disposed adjacent to the first sensor S1, the second sensor S2 includes a second voltage-reference device 150c and a second bio-sensing device 150d, the first sensor S1 is spaced apart from the second sensor S2 by a lateral distance D, and the lateral distance D is greater than a half of an average lateral dimension of the first voltage-reference device 150a and the second voltage-reference device 150c. When the lateral distance D is greater than a half of an average lateral dimension of the first voltage-reference device 150a and the second voltage-reference device 150c, electrical isolation between the first sensor S1 and the second sensor S2 is ensured and the crosstalk between the first sensor S1 and the second sensor S2 can be reduced. The patterned dielectric layer 120' includes sensing wells 122 located above the first voltage-reference device 150a, the first bio-sensing device 150b, the second voltage-reference device 150c and the second bio-sensing device 150d. The cover 170 includes fluid channels 172 which communicate with the sensing wells 122. In some embodiments, the first voltage-reference device 150a includes a first field effect transistor 140a and a first sensing portion 110a of a sensing film 110 which is capacitively coupled to the first field effect transistor 140a, and the first bio-sensing device 150b includes a second field effect transistor 140b and a second sensing portion 110b of a sensing film 110 which is capacitively coupled to the second field effect transistor 140b. In some embodiments, the first sensing portion 110a and the second sensing portion 110b are substantially identical in material. In some alternative embodiments, the material of the first sensing portion 110a is different from the material of the second sensing portion 110b. In some embodiments, the second voltage-reference device 150c includes a third field effect transistor 140c and a third sensing portion 110c of the sensing film 110 which is capacitively coupled to the third field effect transistor 140c, and the second bio-sensing device 150d includes a fourth field effect transistor 140d and a fourth sensing portion 110d of the sensing film 110 which is capacitively coupled to the fourth field effect transistor 140d. In some embodiments, the third sensing portion 140c and the fourth sensing portion 140d are substantially identical in material. In some alternative embodiments, the material of the third sensing portion 140c is different from the material of the fourth sensing portion 140d. In some embodiments, the biosensor further includes at least one isolation structure 102, and the first sensor S1 is laterally spaced apart from the second sensor S2 by the lateral distance D resulted from the at least one isolation structure 102 (e.g., the isolation structure 102a and the isolation structure 102b which is spaced apart from the isolation structure 102a).

As illustrated in FIG. 12, the first voltage-reference device 150a and the first bio-sensing device 150b are respectively distributed in the first region 100R1 and the second region 100R2 of the semiconductor substrate 100 that are surrounded by the first isolation structure 102a, and the first region 100R1 is insulated from the second region 100R2. The second voltage-reference device 150c and the second bio-sensing device 150d of the second sensor S2 are respectively distributed in the third region 100R3 and the fourth region 100R4 of the semiconductor substrate 100 that are surrounded by the second isolation structure 120b, and the third region 100R3 is insulated from the fourth region 100R4. The patterned dielectric layer 120' includes sensing wells 122 located above the first voltage-reference device 150a, the first bio-sensing device 150b, the second voltage-reference device 150c and the second bio-sensing device 150d.

As illustrated in FIG. 12, the first bio-sensing device 150b and the second voltage-reference device 150c are laterally between the first voltage-reference device 150a and the second bio-sensing device 150d, wherein the second voltage-reference device 150c is laterally between the first bio-sensing device 150b and the second bio-sensing device 150d, and the first bio-sensing device 150b is laterally between the first voltage-reference device 150a and the second voltage-reference device 150c. The arrangement of the first voltage-reference device 150a, the first bio-sensing device 150b, the second voltage-reference device 150c and the second bio-sensing device 150d is merely for illustration, other arrangements may be implemented.

Capture reagents are applied to the biosensor, the fluid channels 172 filtrate and guide the applied capture reagents to the first sensor S1 and the second sensor S2. The applied capture reagents immobilize the sensing portions 110a, 110b, 110c and 110d of the sensing film 110 such that sensing portions 110a, 110b, 110c and 110d act as surface receptors to detect the presence of a target analyte of biological origin. During detecting the presence of a target analyte of biological origin, the gate electrode 134a1, source/drain regions 138a1 and the first region 100R1 of the semiconductor substrate 100 are electrically connected to a reference voltage through the interconnect conductors embedded in the interconnect structure 160, and the gate electrode 134a3, the source/drain regions 138a3 and the third region 100R3 of the semiconductor substrate 100 are electrically connected to a reference voltage through the interconnect conductors embedded in the interconnect structure 160. In some embodiments, the gate electrode 134a1, source/drain regions 138a1 and the first region 100R1 of the semiconductor substrate 100 in the first voltage-reference device 150a as well as the gate electrode 134a3, the source/drain regions 138a3 and the third region 100R3 of the semiconductor substrate 100 in the second voltage-reference device 150c are electrically connected to the same reference voltage. In some other embodiments, the gate electrode 134a1, source/drain regions 138a1 and the first region 100R1 of the semiconductor substrate 100 in the first voltage-reference device 150a as well as the gate electrode 134a3, the source/drain regions 138a3 and the third region 100R3 of the semiconductor substrate 100 in the second voltage-reference device 150c are electrically connected to different reference voltages.

Take the detection data measured from the first voltage-reference device 150a and the second voltage-reference device 150c as a reference, the detection data measured from the first bio-sensing device 150b and the second bio-sensing device 150d may be more reliable. Accordingly, the first sensor S1 and the second sensor S2 may detect the presence of a target analyte of biological origin precisely.

Figure 13:
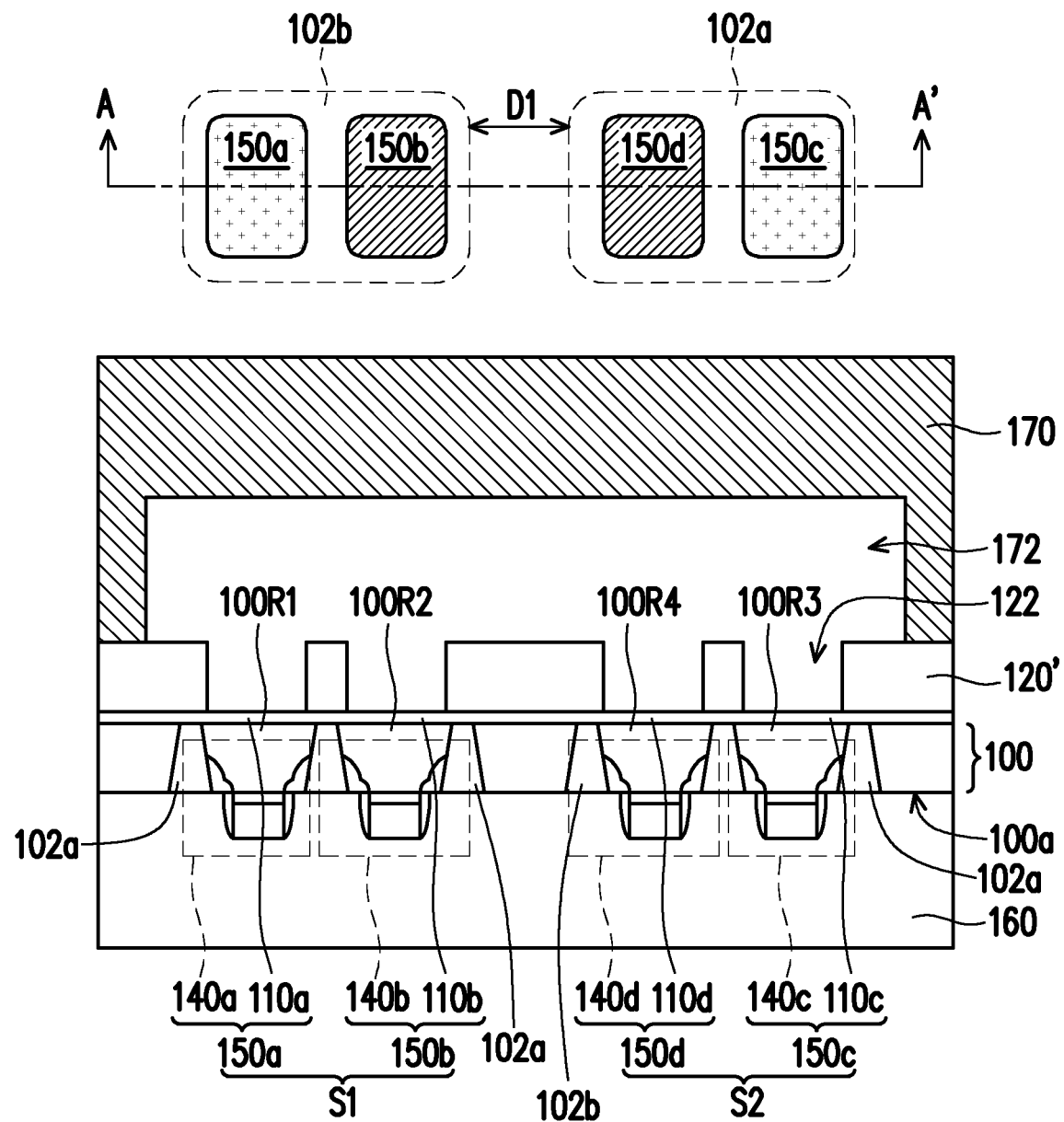

Referring to FIG. 12 and FIG. 13, the biosensor shown in FIG. 13 is similar to the biosensor shown in FIG. 12 except that the first bio-sensing device 150b and the second bio-sensing device 150d shown in FIG. 13 are disposed between the first voltage-reference device 150a and the second voltage-reference device 150c.

Figure 14:
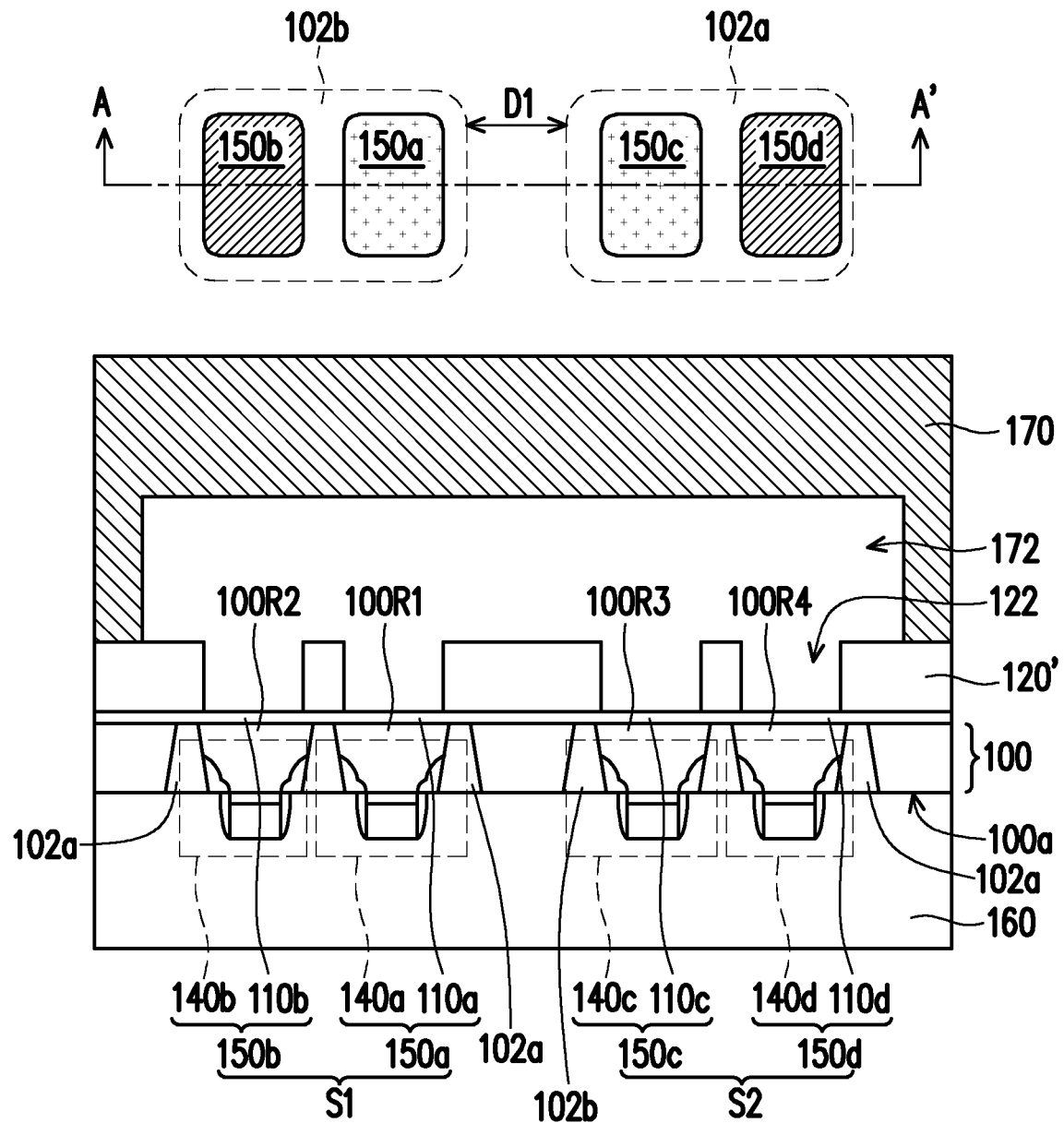

Referring to FIG. 12 and FIG. 14, the biosensor shown in FIG. 14 is similar to the biosensor shown in FIG. 12 except that the first voltage-reference device 150a and the second voltage-reference device 150c shown in FIG. 14 are disposed between the first bio-sensing device 150b and the second bio-sensing device 150d.

Figure 15:
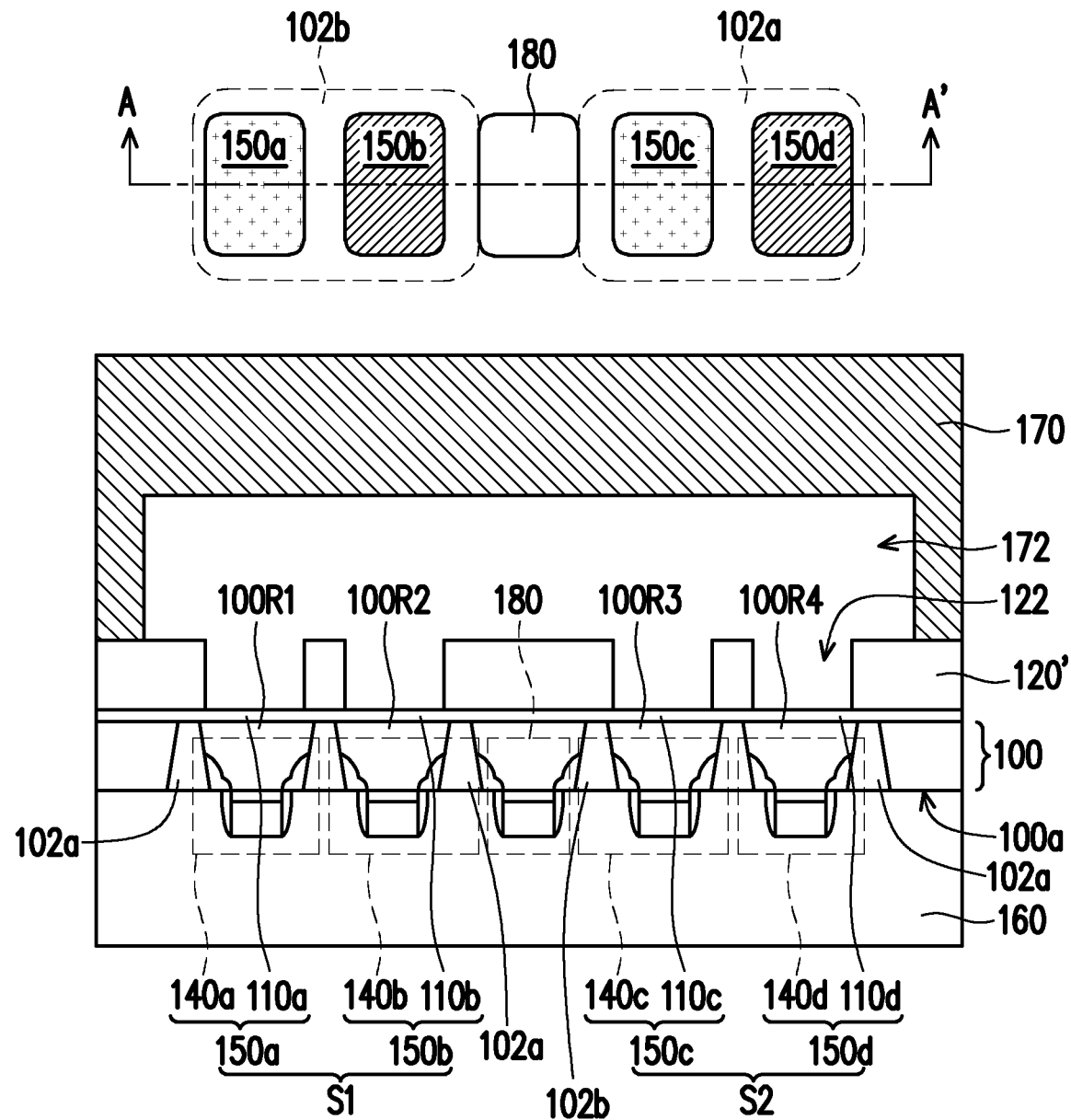

Referring to FIG. 12 and FIG. 15, the biosensor shown in FIG. 15 is similar to the biosensor shown in FIG. 12 except that the biosensor shown in FIG. 15 further includes an isolation field effect transistor 180 disposed on the first surface 100a of the semiconductor substrate 100, and the isolation field effect transistor 180 is between the first sensor S1 and the second sensor S2. The isolation field effect transistor 180 may ensure electrical isolation between the first sensor S1 and the second sensor S2 as well as reduce the crosstalk between the first sensor S1 and the second sensor S2. For example, the isolation field effect transistor 180 is between the first isolation structure 102a and the second isolation structure 102b. The isolation field effect transistor 180 may be a n-type FET, a p-type FET or combinations thereof. A common type of FET is referred to as a MOSFET. MOSFETs have been planar structures built in and on the planar surface of a substrate such as a semiconductor wafer. But recent advances in semiconductor manufacturing have resulted in three-dimensional, of fin-based, MOSFET structures.

Figure 16:
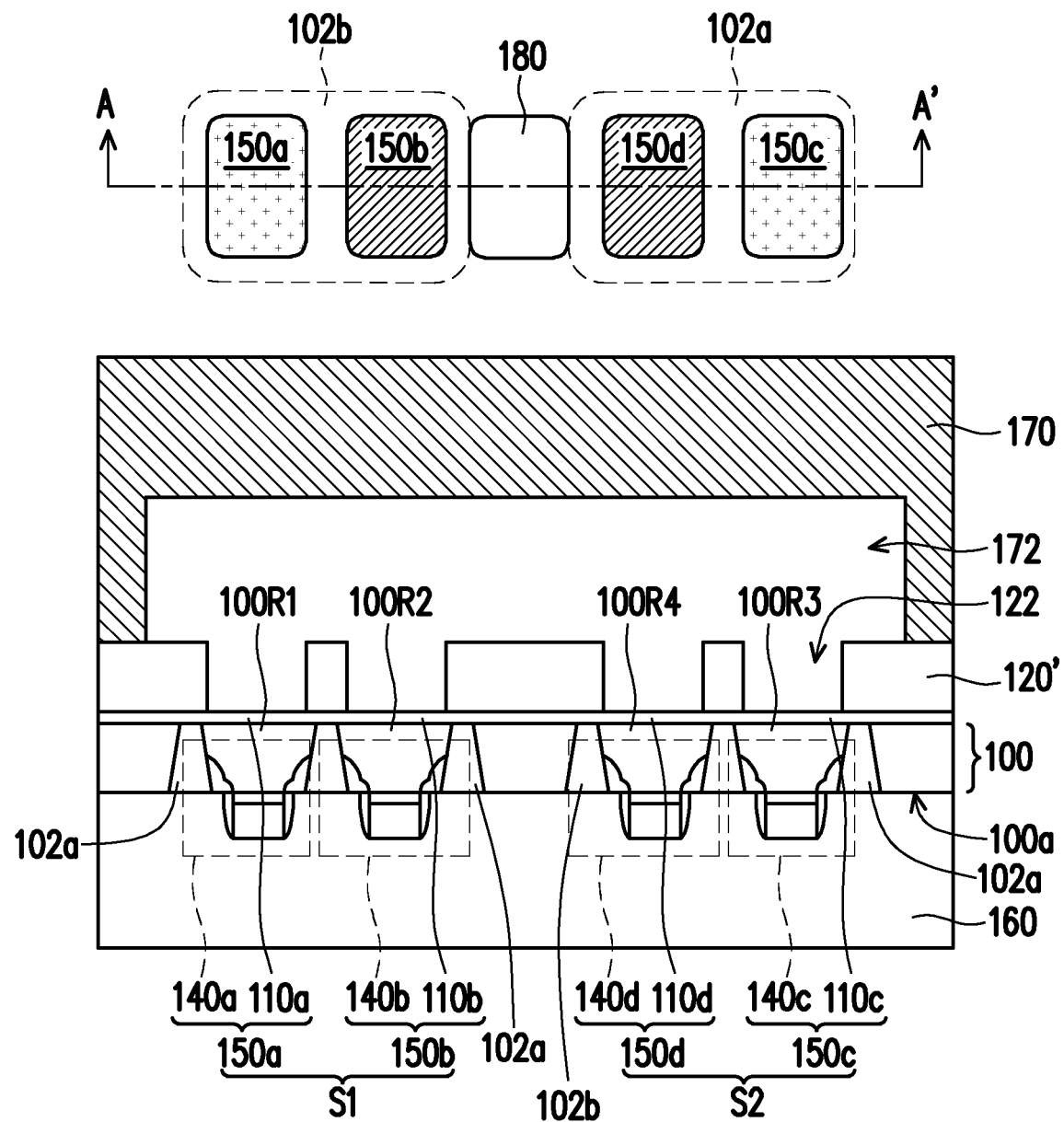

Referring to FIG. 15 and FIG. 16, the biosensor shown in FIG. 16 is similar to the biosensor shown in FIG. 15 except that the first bio-sensing device 150b and the second bio-sensing device 150d shown in FIG. 16 are disposed between the first voltage-reference device 150a and the second voltage-reference device 150c.

Figure 17:
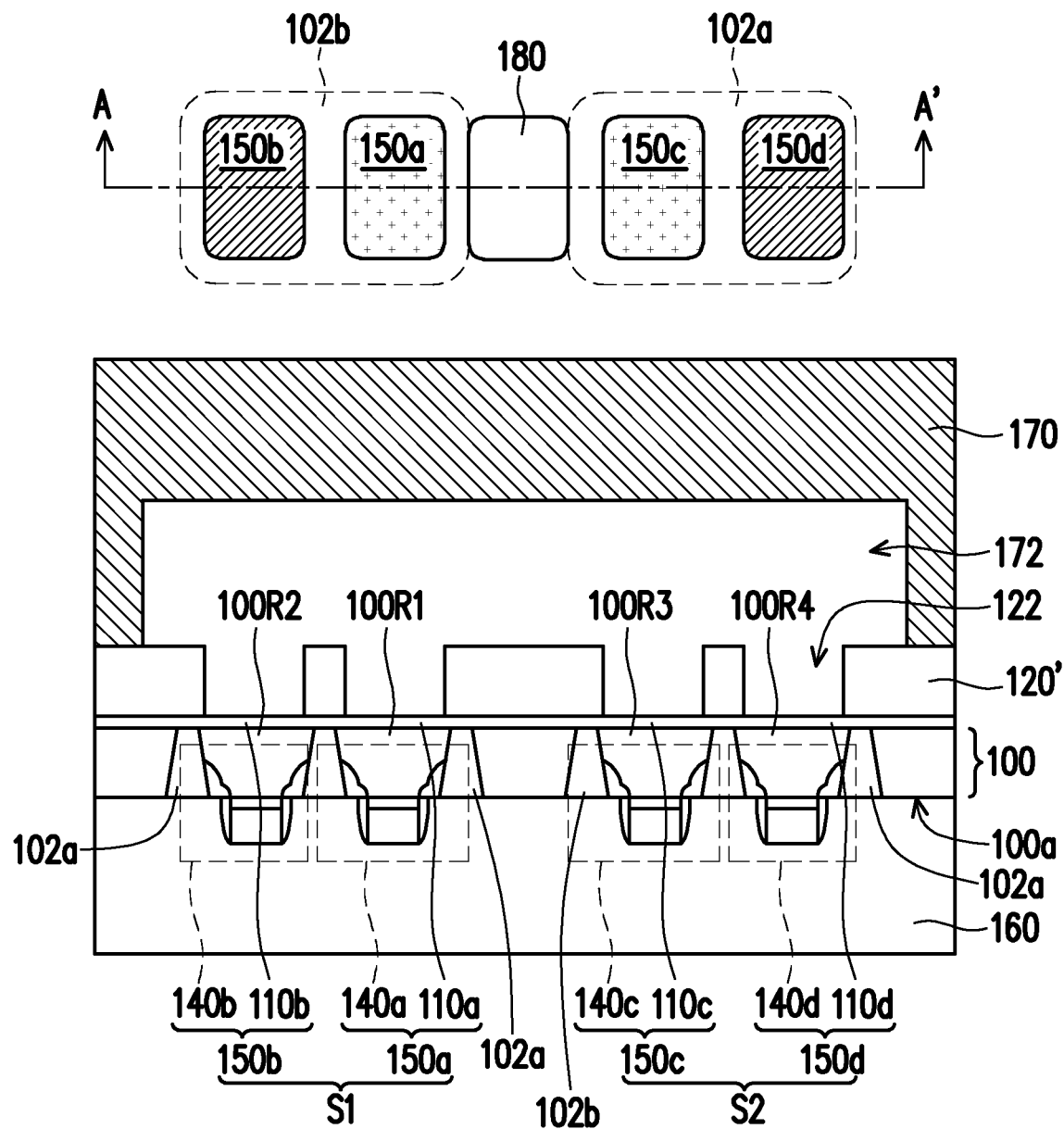

Referring to FIG. 15 and FIG. 17, the biosensor shown in FIG. 17 is similar to the biosensor shown in FIG. 15 except that the first voltage-reference device 150a and the second voltage-reference device 150c shown in FIG. 17 are disposed between the first bio-sensing device 150b and the second bio-sensing device 150d.

Figure 18:
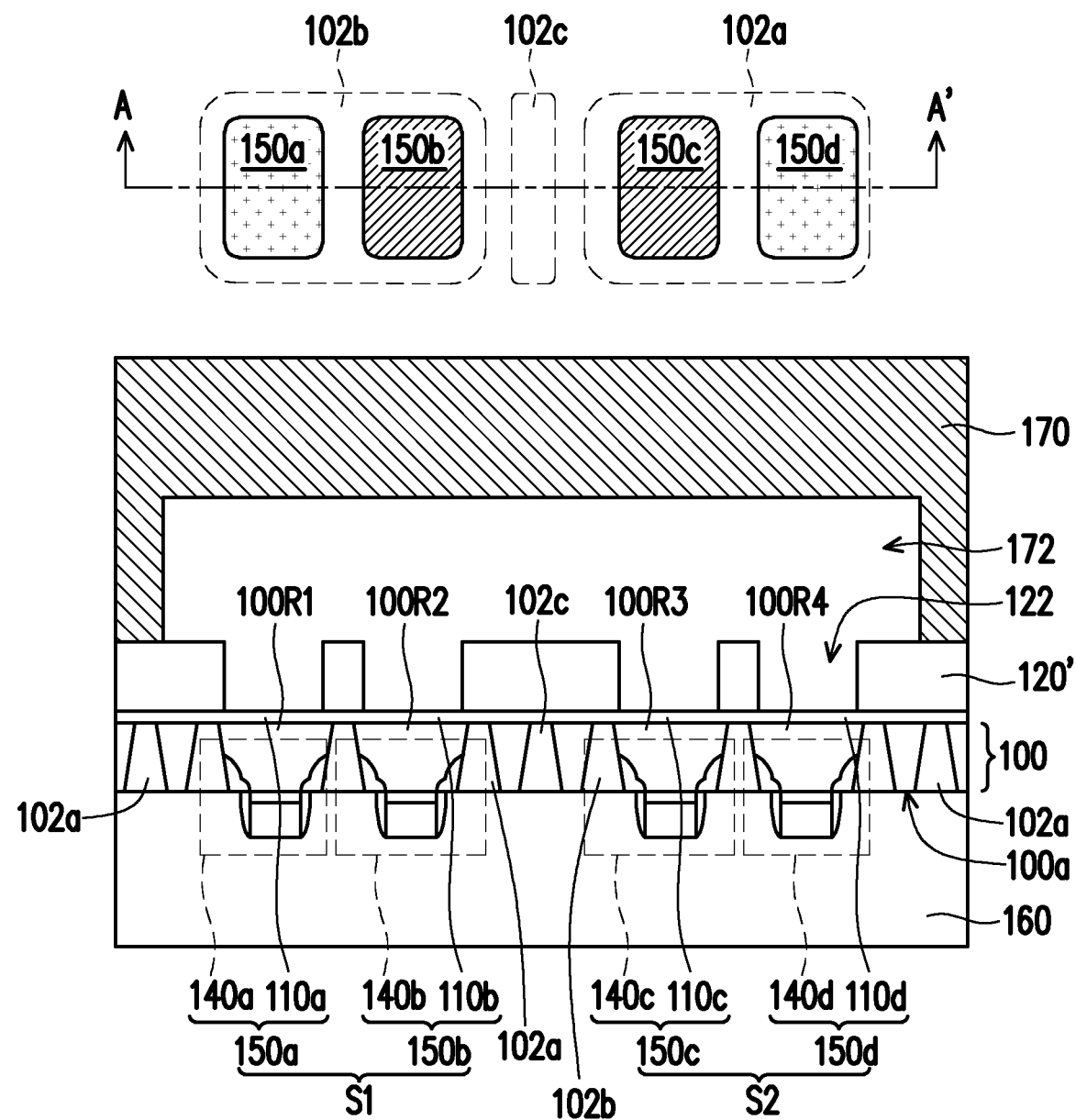

Referring to FIG. 12 and FIG. 18, the biosensor shown in FIG. 18 is similar to the biosensor shown in FIG. 12 except that the biosensor shown in FIG. 18 further includes an isolation structure 102c laterally spaced apart from the first isolation structure 102a and the second isolation structure 102b. The isolation structure 102c penetrates through the semiconductor substrate 100 and located between the first isolation structure 102a and the second isolation structure 102b. The isolation structure 102c may enhance electrical isolation between the first sensor S1 and the second sensor S2 as well as reduce the crosstalk between the first sensor S1 and the second sensor S2.

Figure 19:
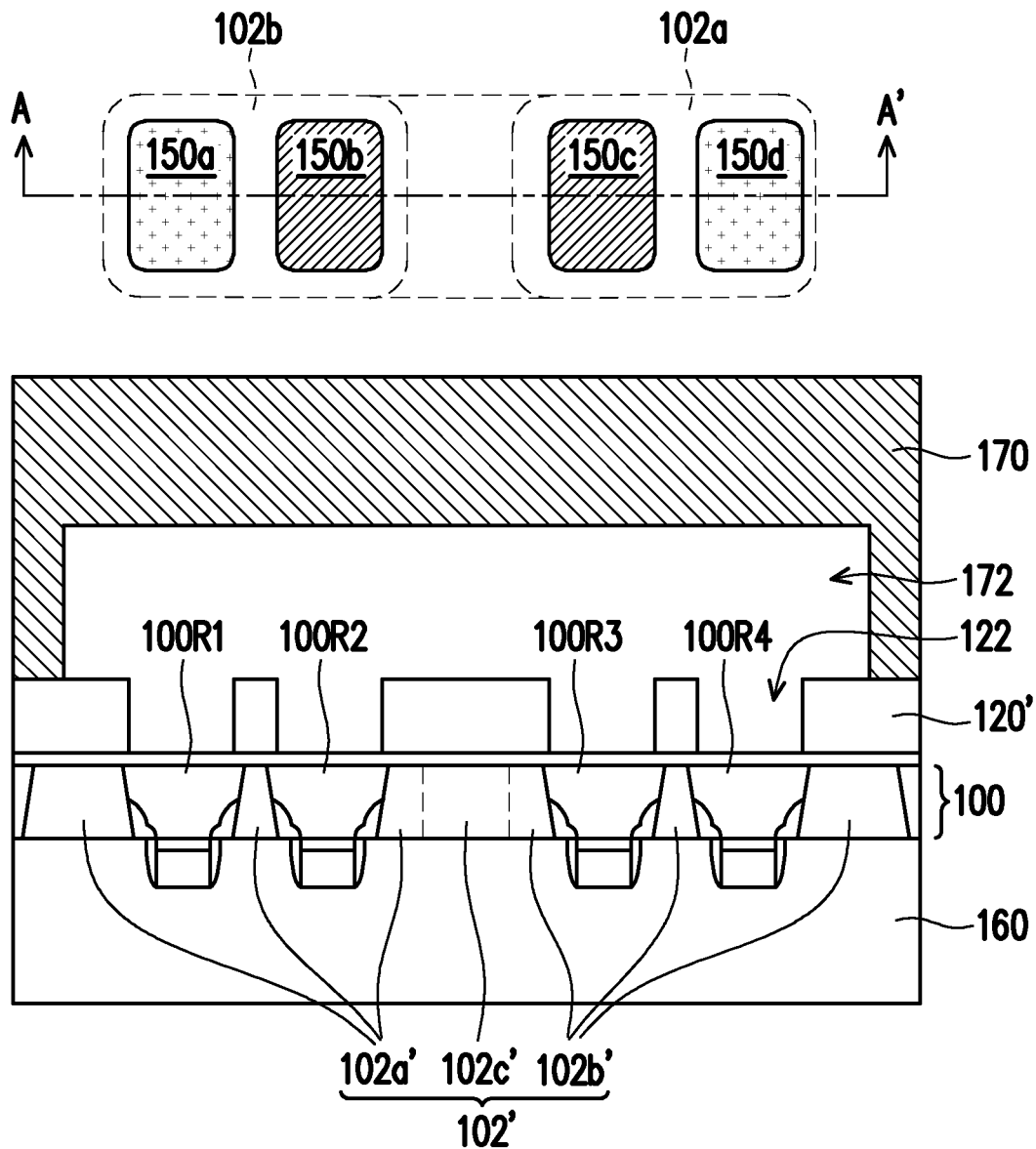

Referring to FIG. 19, the biosensor shown in FIG. 19 is similar to the biosensor shown in FIG. 12 except that the isolation structure 102' of the biosensor shown in FIG. 19 includes a first isolation portion 102a', a second isolation 102b' and a connection portion 102c' which laterally connects between the first isolation portion 102a' and the second isolation portion 120b'. The first voltage-reference device 150a and the first bio-sensing device 150b in the first sensor S1 are respectively distributed in the first region 100R1 and the second region 100R2 of the semiconductor substrate 100 that are surrounded by the first isolation portion 120a' of the isolation structure 102'. The second voltage-reference device 150c and the second bio-sensing device 150d of the second sensor S2 are respectively distributed in the third region 100R3 and the fourth region 100R4 of the semiconductor substrate 100 that are surrounded by the second isolation portion 102b' of the isolation structure 102'. Furthermore, the first sensor S1 is laterally spaced apart from the second sensor S2 by the lateral distance D resulted from the connection portion 102c' of the isolation structure 102'. The connection portion 102c' of the isolation structure 102' may enhance electrical isolation between the first sensor S1 and the second sensor S2 as well as reduce the crosstalk between the first sensor S1 and the second sensor S2.

In the above-mentioned embodiments, the crosstalk between adjacent sensors in a biosensor may be reduced, and reliability of the biosensor may be improved accordingly.

In accordance with some embodiments of the disclosure, a biosensor including a first sensor, a second sensor, a patterned dielectric layer and a cover is provided. The first sensor includes a first voltage-reference device and a first bio-sensing device. The second sensor is disposed adjacent to the first sensor, the second sensor includes a second voltage-reference device and a second bio-sensing device, the first sensor is spaced apart from the second sensor by a lateral distance, and the lateral distance is greater than a half of an average lateral dimension of the first voltage-reference device and the second voltage-reference device. The patterned dielectric layer includes sensing wells located above the first voltage-reference device, the first bio-sensing device, the second voltage-reference device and the second bio-sensing device. The cover includes fluid channels communicating with the sensing wells. In some embodiments, the first voltage-reference device includes a first field effect transistor and a first sensing film capacitively coupled to the first field effect transistor, and the first bio-sensing device includes a second field effect transistor and a second sensing film capacitively coupled to the second field effect transistor. In some embodiments, the first sensing film and the second sensing film are substantially identical in material. In some embodiments, a material of the first sensing film is different from a material of the second sensing film. In some embodiments, the second voltage-reference device includes a third field effect transistor and a third sensing film capacitively coupled to the third field effect transistor, and the second bio-sensing device includes a fourth field effect transistor and a fourth sensing film capacitively coupled to the fourth field effect transistor. In some embodiments, the third sensing film and the fourth sensing film are substantially identical in material. In some embodiments, a material of the third sensing film is different from a material of the fourth sensing film. In some embodiments, the biosensor further includes at least one isolation structure, and the first sensor is laterally spaced apart from the second sensor by the lateral distance resulted from the at least one isolation structure.

In accordance with some other embodiments of the disclosure, a biosensor including a substrate, a first sensor, a second sensor and a patterned dielectric layer is provided. The substrate includes a first isolation structure and a second isolation structure spaced apart from the first isolation structure. The first sensor is in the substrate, the first sensor includes a first voltage-reference device and a first bio-sensing device, the first voltage-reference device and the first bio-sensing device are respectively distributed in a first region and a second region of the substrate that are surrounded by the first isolation structure, and the first region is insulated from the second region. The second sensor is in the substrate, the second sensor includes a second voltage-reference device and a second bio-sensing device, the second voltage-reference device and the second bio-sensing device are respectively distributed in a third region and a fourth region of the substrate that are surrounded by the second isolation structure, and the third region is insulated from the fourth region. The patterned dielectric layer includes sensing wells located above the first voltage-reference device, the first bio-sensing device, the second voltage-reference device and the second bio-sensing device. In some embodiments, the first sensor is spaced apart from the second sensor by a lateral distance resulted from the first isolation structure and the second isolation structure, and the lateral distance is greater than a half of an average lateral dimension of the first voltage-reference device and the second voltage-reference device. In some embodiments, the first voltage-reference device includes a first field effect transistor disposed on a first surface of the substrate and a first sensing portion of a sensing film disposed on a second surface of the substrate, the first surface is opposite to the second surface, the first sensing portion is capacitively coupled to the first field effect transistor, and the first bio-sensing device includes a second field effect transistor disposed on the first surface of the substrate and a second sensing portion of the sensing film disposed on the second surface of the substrate, and the second sensing portion is capacitively coupled to the second field effect transistor. In some embodiments, the first field effect transistor is distributed in the first region of the substrate, the first field effect transistor includes a first gate, a first source as well as a first drain, and the first gate, the first source, the first drain and the first region are electrically connected to a reference voltage. In some embodiments, the second voltage-reference device includes a third field effect transistor disposed on the first surface of the substrate and a third sensing portion of the sensing film disposed on the second surface of the substrate, the third sensing portion is capacitively coupled to the third field effect transistor, and the second bio-sensing device includes a fourth field effect transistor disposed on the first surface of the substrate and a fourth sensing portion of the sensing film disposed on the second surface of the substrate, and the fourth sensing portion is capacitively coupled to the fourth field effect transistor. In some embodiments, the second field effect transistor is distributed in the second region of the substrate, the second field effect transistor includes a second gate, a second source as well as a second drain, and the second gate, the second source, the second drain and the second region are electrically connected to a reference voltage. In some embodiments, the first voltage-reference device and the second voltage-reference device are disposed between the first bio-sensing device and the second bio-sensing device. In some embodiments, the first bio-sensing device and the second bio-sensing device are disposed between the first voltage-reference device and the second voltage-reference device. In some embodiments, the second voltage-reference device is disposed between the first bio-sensing device and the second bio-sensing device, and the first bio-sensing device is disposed between the first voltage-reference device and the second voltage-reference device. In some embodiments, the biosensor further includes an isolation field effect transistor disposed on the first surface of the substrate, and the isolation field effect transistor is between the first sensor and the second sensor. In some embodiments, the biosensor further includes a cover having fluid channels, and the fluid channels communicate with the sensing wells.

In accordance with some other embodiments of the disclosure, a biosensor including a substrate, a first sensor, a second sensor and a patterned dielectric layer is provided. The substrate includes an isolation structure. The first sensor is in the substrate, wherein the first sensor includes a first voltage-reference device and a first bio-sensing device, the first voltage-reference device and the first bio-sensing device are respectively distributed in a first region and a second region of the substrate that are surrounded by a first isolation portion of the isolation structure, and the first region is insulated from the second region. The second sensor is in the substrate, wherein the second sensor includes a second voltage-reference device and a second bio-sensing device, the second voltage-reference device and the second bio-sensing device are respectively distributed in a third region and a fourth region of the substrate that are surrounded by a second isolation portion of the isolation structure, the third region is insulated from the fourth region. Furthermore, the first sensor is laterally spaced apart from the second sensor by the lateral distance resulted from a connection portion of the isolation structure, and the connection portion is connected to and located between the first isolation portion and the second isolation portion. The patterned dielectric layer includes sensing wells located above the first voltage-reference device, the first bio-sensing device, the second voltage-reference device and the second bio-sensing device.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A biosensor, comprising:
a first sensor comprising a first voltage-reference device and a first bio-sensing device;
a second sensor disposed adjacent to the first sensor, the second sensor comprising a second voltage-reference device and a second bio-sensing device, wherein the first sensor is spaced apart from the second sensor by a lateral distance, and the lateral distance is greater than a half of an average lateral dimension of the first voltage-reference device and the second voltage-reference device;
a patterned dielectric layer comprising sensing wells located above the first voltage-reference device, the first bio-sensing device, the second voltage-reference device and the second bio-sensing device; and
a cover having fluid channels communicating with the sensing wells.

2. The biosensor of claim 1, wherein
the first voltage-reference device comprises a first field effect transistor and a first sensing film capacitively coupled to the first field effect transistor, and
the first bio-sensing device comprises a second field effect transistor and a second sensing film capacitively coupled to the second field effect transistor.

3. The biosensor of claim 2, wherein the first sensing film and the second sensing film are substantially identical in material.

4. The biosensor of claim 2, wherein a material of the first sensing film is different from a material of the second sensing film.

5. The biosensor of claim 1, wherein
the second voltage-reference device comprises a third field effect transistor and a third sensing film capacitively coupled to the third field effect transistor, and
the second bio-sensing device comprises a fourth field effect transistor and a fourth sensing film capacitively coupled to the fourth field effect transistor.

6. The biosensor of claim 5, wherein the third sensing film and the fourth sensing film are substantially identical in material.

7. The biosensor of claim 5, wherein a material of the third sensing film is different from a material of the fourth sensing film.

8. The biosensor of claim 1 further comprising at least one isolation structure, wherein the first sensor is laterally spaced apart from the second sensor by the lateral distance resulted from the at least one isolation structure.

9. A biosensor, comprising:
a substrate comprising a first isolation structure and a second isolation structure spaced apart from the first isolation structure;
a first sensor in the substrate, wherein the first sensor comprises a first voltage-reference device and a first bio-sensing device, the first voltage-reference device and the first bio-sensing device are respectively distributed in a first region and a second region of the substrate that are surrounded by the first isolation structure, and the first region is insulated from the second region;
a second sensor in the substrate, wherein the second sensor comprises a second voltage-reference device and a second bio-sensing device, the second voltage-reference device and the second bio-sensing device are respectively distributed in a third region and a fourth region of the substrate that are surrounded by the second isolation structure, and the third region is insulated from the fourth region; and
a patterned dielectric layer comprising sensing wells located above the first voltage-reference device, the first bio-sensing device, the second voltage-reference device and the second bio-sensing device, wherein the first sensor is spaced apart from the second sensor by a lateral distance resulted from the first isolation structure and the second isolation structure, and the lateral distance is greater than a half of an average lateral dimension of the first voltage-reference device and the second voltage-reference device.

10. The biosensor of claim 9, wherein
the first voltage-reference device comprises a first field effect transistor and a first sensing film capacitively coupled to the first field effect transistor,
the first bio-sensing device comprises a second field effect transistor and a second sensing film capacitively coupled to the second field effect transistor,
the second voltage-reference device comprises a third field effect transistor and a third sensing film capacitively coupled to the third field effect transistor, and
the second bio-sensing device comprises a fourth field effect transistor and a fourth sensing film capacitively coupled to the fourth field effect transistor.

11. The biosensor of claim 9, wherein
the first voltage-reference device comprises a first field effect transistor disposed on a first surface of the substrate and a first sensing portion of a sensing film disposed on a second surface of the substrate, the first surface is opposite to the second surface, the first sensing portion is capacitively coupled to the first field effect transistor, and
the first bio-sensing device comprises a second field effect transistor disposed on the first surface of the substrate and a second sensing portion of the sensing film disposed on the second surface of the substrate, and the second sensing portion is capacitively coupled to the second field effect transistor.

12. The biosensor of claim 11, wherein the first field effect transistor is distributed in the first region of the substrate, the first field effect transistor comprises a first gate, a first source as well as a first drain, and the first gate, the first source, the first drain and the first region are electrically connected to a reference voltage.

13. The biosensor of claim 11, wherein
the second voltage-reference device comprises a third field effect transistor disposed on the first surface of the substrate and a third sensing portion of the sensing film disposed on the second surface of the substrate, the third sensing portion is capacitively coupled to the third field effect transistor, and
the second bio-sensing device comprises a fourth field effect transistor disposed on the first surface of the substrate and a fourth sensing portion of the sensing film disposed on the second surface of the substrate, and the fourth sensing portion is capacitively coupled to the fourth field effect transistor.

14. The biosensor of claim 13, wherein the second field effect transistor is distributed in the second region of the substrate, the second field effect transistor comprises a second gate, a second source as well as a second drain, and the second gate, the second source, the second drain and the second region are electrically connected to a reference voltage.

15. The biosensor of claim 9, wherein the first voltage-reference device and the second voltage-reference device are disposed between the first bio-sensing device and the second bio-sensing device.

16. The biosensor of claim 9, wherein the first bio-sensing device and the second bio-sensing device are disposed between the first voltage-reference device and the second voltage-reference device.

17. The biosensor of claim 9, wherein the second voltage-reference device is disposed between the first bio-sensing device and the first bio-sensing device, and the second bio-sensing device is disposed between the first voltage-reference device and the second voltage-reference device.

18. The biosensor of claim 9 further comprising an isolation field effect transistor disposed on the first surface of the substrate, wherein the isolation field effect transistor is between the first sensor and the second sensor.

19. The biosensor of claim 9 further comprising a cover having fluid channels, wherein the fluid channels communicate with the sensing wells.

20. A biosensor, comprising:
a substrate comprising an isolation structure;
a first sensor in the substrate, wherein the first sensor comprises a first voltage-reference device and a first bio-sensing device, the first voltage-reference device and the first bio-sensing device are respectively distributed in a first region and a second region of the substrate that are surrounded by a first isolation portion of the isolation structure, and the first region is insulated from the second region;
a second sensor in the substrate, wherein the second sensor comprises a second voltage-reference device and a second bio-sensing device, the second voltage-reference device and the second bio-sensing device are respectively distributed in a third region and a fourth region of the substrate that are surrounded by a second isolation portion of the isolation structure, the third region is insulated from the fourth region, the first sensor is laterally spaced apart from the second sensor by the lateral distance resulted from a connection portion of the isolation structure, and the connection portion is connected to and located between the first isolation portion and the second isolation portion; and
a patterned dielectric layer comprising sensing wells located above the first voltage-reference device, the first bio-sensing device, the second voltage-reference device and the second bio-sensing device.

* * * * *